United States Patent
Richards et al.

(10) Patent No.: US 8,915,518 B2
(45) Date of Patent: *Dec. 23, 2014

(54) SIDE AIRBAG MODULE ASSEMBLY

(71) Applicant: Autoliv ASP, Inc., Ogden, UT (US)

(72) Inventors: Charles Richards, Farmington, UT (US); Louis Mueller, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,057

(22) Filed: May 13, 2014

(65) Prior Publication Data

US 2014/0246844 A1   Sep. 4, 2014

Related U.S. Application Data

(63) Continuation-in-part of application No. 13/179,801, filed on Jul. 11, 2011, now Pat. No. 8,764,049.

(51) Int. Cl.
 *B60R 21/16* (2006.01)
(52) U.S. Cl.
 USPC .................................. 280/728.2; 280/730.2
(58) Field of Classification Search
 USPC ................................ 280/728.2, 730.2, 728.3
 See application file for complete search history.

(56) References Cited

U.S. PATENT DOCUMENTS

| | | | |
|---|---|---|---|
| 5,538,277 A | 7/1996 | Frary et al. | |
| 5,547,214 A | 8/1996 | Zimmerman et al. | |
| 5,639,111 A | 6/1997 | Spencer et al. | |
| 5,669,627 A | 9/1997 | Marjanski et al. | |
| 5,676,393 A | 10/1997 | Rose | |
| 5,676,394 A | 10/1997 | Maly | |
| 5,735,572 A | 4/1998 | Clark et al. | |
| 5,799,970 A | 9/1998 | Enders et al. | |
| 5,803,490 A | 9/1998 | Seventko et al. | |
| 5,944,342 A | 8/1999 | White et al. | |
| 5,979,979 A | 11/1999 | Guerinot et al. | |
| 6,179,324 B1 | 1/2001 | White et al. | |
| 6,382,665 B2 | 5/2002 | Holdampf et al. | |
| 7,641,226 B2 | 1/2010 | Sundmark et al. | |
| 2008/0203787 A1 | 8/2008 | Tracht et al. | |

FOREIGN PATENT DOCUMENTS

| | | |
|---|---|---|
| DE | 101 41 461 B4 | 8/2004 |
| DE | 103 40 508 A1 | 3/2005 |

*Primary Examiner* — Faye M. Fleming
(74) *Attorney, Agent, or Firm* — Brinks Gilson & Lione

(57) ABSTRACT

A side airbag module assembly for a vehicle seat back rest features a molded plastic cover (22) with a Class A surface constituting the outside of the cover visible after installation in the backrest (60). An airbag holder portion (24) made of plastic is molded onto the cover (22). The airbag holder portion (24) is formed as a fastening bracket (34). An airbag (15) including a gas generator (14) is prepackaged in a soft pack (12) with fasteners (20) protruding from the soft pack (12). The fasteners (20) and the fastening bracket (34) are configured to attach the soft pack (12) to the airbag holder portion (24). Upon deployment of the airbag, the fastening bracket (34) will bend and thereby open the cover (22), which allows the airbag (15) to inflate in a forward direction.

12 Claims, 3 Drawing Sheets

SIDE AIRBAG MODULE ASSEMBLY

CROSS-REFERENCE TO RELATED APPLICATIONS

This application is a Continuation-in-Part of U.S. application Ser. No. 13/179,801, filed on Jul. 11, 2011, the disclosure of which is hereby incorporated by reference in its entirety.

FIELD OF THE INVENTION

The present invention generally relates to airbags for use as an impact protection device for an occupant of a motor vehicle. More specifically, it relates to a side airbag module with a gas generator and a folded airbag accommodated in a back rest of a vehicle seat also called seat back. The airbag unfolds into the interior of the motor vehicle when the associated gas generator is activated by an electrical signal received from an electronic control unit of the vehicle when an impact is sensed.

BACKGROUND OF THE INVENTION

A usual design of a side airbag module includes a gas generator mounted inside a cavity in a side bolster of a back rest of a vehicle seat. The gas generator is mounted on a backside of the seat cavity and projects inflation gas in a forward direction of the vehicle. In the seat cavity, a folded airbag is arranged around and attached to the gas generator. The seat cavity is enclosed by a cover made of a molded shell of optically appealing plastic material that conceals the airbag module. The cover forms a visible surface of the back rest. The cover has an intentionally weakened seam or line of reduced thickness designed to break when the gas generator inflates the airbag.

The cover forms a Class A surface. Class A surface areas are those that remain visible when the part is installed on the vehicle when all mating components, such as hoods, doors, and trunk lids, are in a closed position. Standards for Class A surfaces may vary by manufacturer and generally specify permissible parameter ranges for aesthetically pleasing appearance without posing an elevated injury risk upon impact. For example, for Class A surfaces, excessive roughness, sharp edges, and sharp corners are not permissible. Class A surfaces have curvature and tangency alignment, which means that not only the surface must be mathematically continuous, but also its curvature radius. Thus, Class A surfaces to have at least a so-called G2 curvature continuity, possibly or even a G3 curvature continuity that also requires a change of the curvature radius to be mathematically continuous.

The above-described known airbag arrangement, in which the gas generator is mounted in the side bolster of the vehicle seat back, has the disadvantage that each part of the gas generator must be individually attached to a fastening structure inside the seat cavity that may not be easily accessible for assembly.

SUMMARY OF THE INVENTION

It is the objective of the present invention to eliminate the module housing and integrate the deflector plate and the Class A cover.

This objective is met by the following measures. The airbag module assembly includes a molded plastic cover visible to an occupant after installation of the seat. Opposite to exposed surface of the cover, an airbag holder portion is molded to the cover. The airbag holder portion in the form of a fastening bracket is formed in one monolithic piece with the cover. An airbag including a gas generator with fasteners is prepackaged in a soft pack. The soft pack may be covered by a wrapper made of a thin woven or non-woven textile material, plastic, or foil cover with the fasteners penetrating the wrapper material. The wrapper has a designated tear line of weakened material or a tear seam. The wrapper could also be merely a tape or flap used to hold the assembly together and may not require a tear seam. The fasteners and the fastening bracket are configured to attach the soft pack to the airbag holder portion.

Further details and advantages of the present invention will become apparent from the following description of exemplary embodiments illustrated by drawings.

DETAILED DESCRIPTION OF PREFERRED EMBODIMENTS

Figure 1:
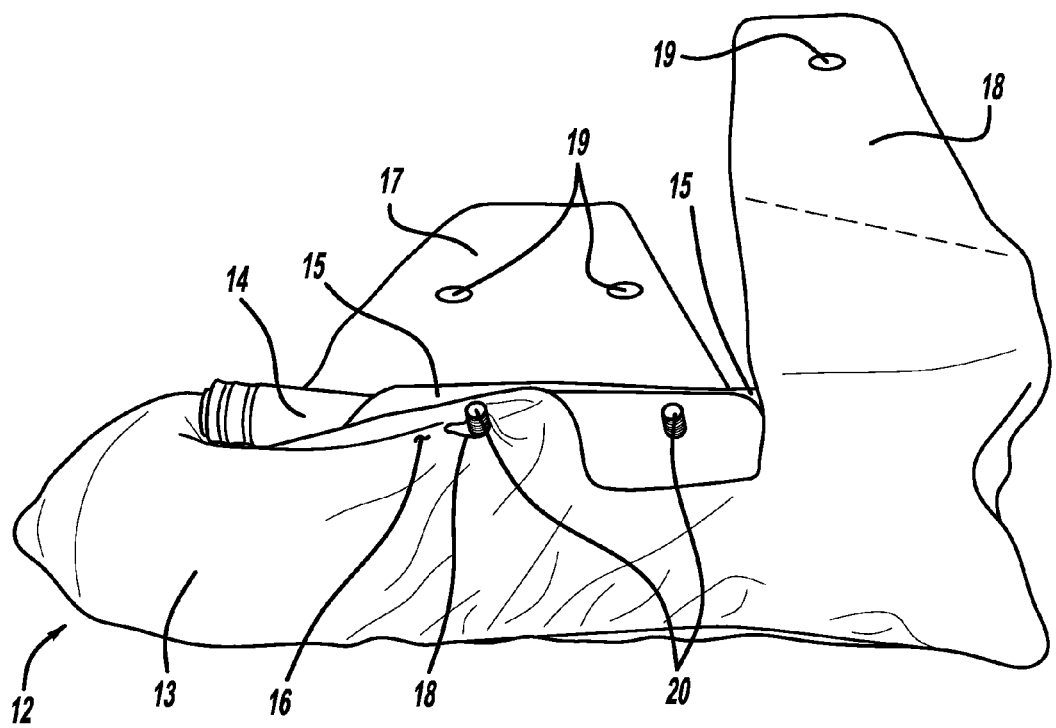
FIG. 1 shows a subassembly of an airbag and a gas generator currently being wrapped into a soft pack.
Figure 2:
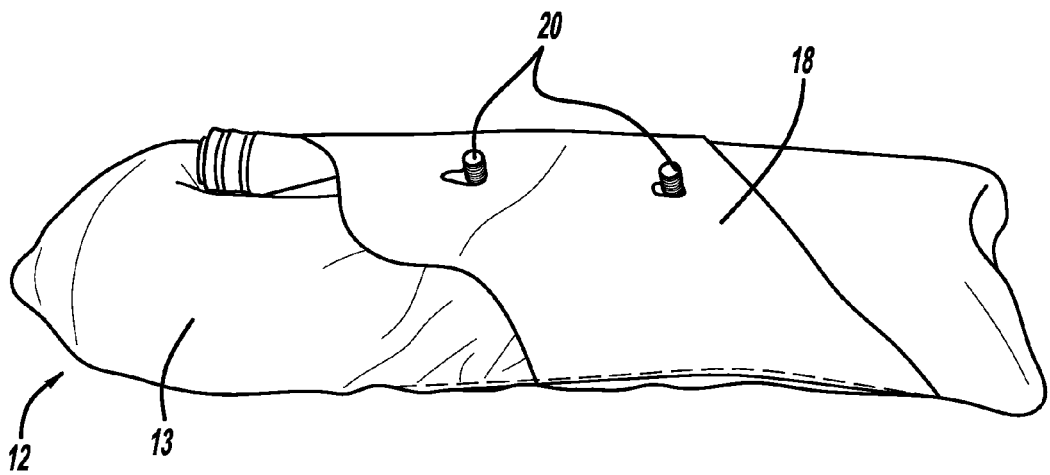
FIG. 2 shows the subassembly of FIG. 1 wrapped in the soft pack.
Figure 3:
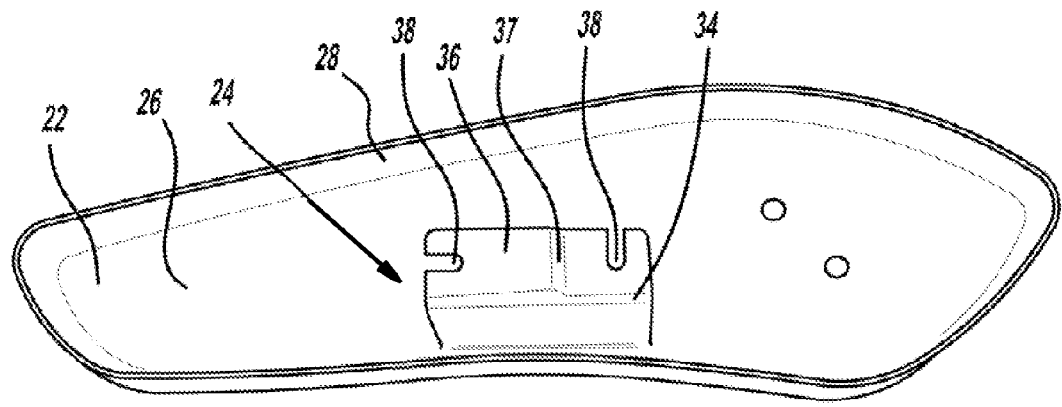
FIG. 3 shows a cover with an attached airbag holder portion formed by an integral fastening bracket.
Figure 4:
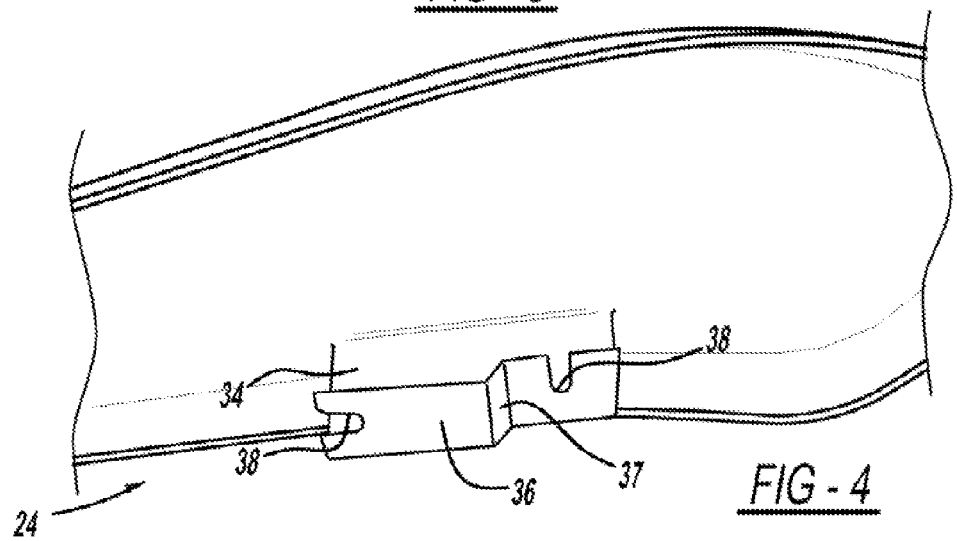
FIG. 4 shows a different view of the arrangement of FIG. 3
Figure 5:
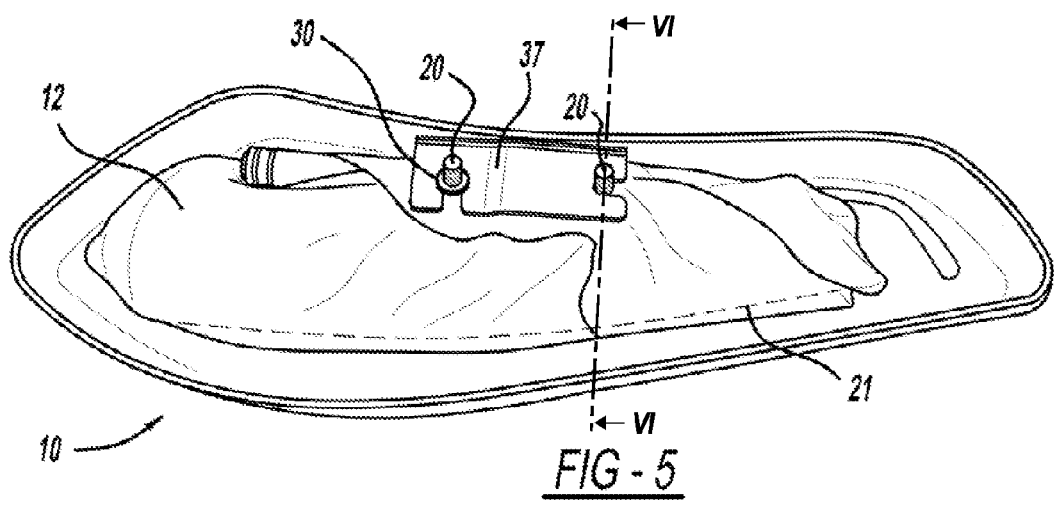
FIG. 5 shows the soft pack of FIG. 1 attached to the fastening bracket of the airbag holder portion.

FIGS. 1-4 detail steps of assembling a side airbag module 10 as shown in FIG. 5, starting with an airbag soft pack 12 depicted in FIGS. 1 and 2. The soft pack 12 features a wrapper 13 with a first flap 16, a second flap 17, and a third flap 18 and envelops a folded airbag 15 and a gas generator 14. Two threaded fastening bolts 20 connected to the gas generator 14 penetrate the three flaps 16-18 of the wrapper 13 from the inside to the outside. The first flap 16 is wrapped in a first direction and overlaps one of the fastening bolts 20 that protrude through the first flap 16 through a corresponding hole 19. The second flap 17 is wrapped in the opposite direction of the first flap 16, partially overlapping the latter and has two holes 19 hitched onto both of the bolts 20. The third flap 18 extends in the same direction as the first flap 16, partially overlapping with the second flap 17. The third flap 18 has one hole 19 attached to the bolt 20 left free by the first flap 16. The wrapper 13 is made of woven or non-woven textile material, plastic, or foil and has an intentionally weak seam 21 in the wrapper 13 designed to tear open when the gas generator 14 inflates the airbag 15 inside the wrapper 13.

FIG. 3 shows a cover 22 made of molded plastic material. The cover 22 has an elongated shape with two long sides and two short sides to cover a matching cavity opening in a side bolster of a back rest of a vehicle seat. The cover 22 features an exterior surface (not visible in FIG. 3) that meets Class A standards of the manufacturer of the vehicle fitted with the cover 22, either by being covered with upholstery fabric or by its own preferably textured appearance. An interior surface of the cover 22 opposite the Class A surface has a center area 26 that is substantially flat, framed by a rim 28 bent toward the interior side of the cover 22. An airbag holder portion 24 formed by a fastening bracket 34 is unitarily molded in one piece with the cover 22 to form a monolithic structure. FIG. 4 shows the airbag holder portion 24 in a different view that illustrates how cover 22 and the fastening bracket 34 are formed of one piece of high-strength plastic. The fastening bracket bends under forces exerted during the inflation of the airbag 15. It has surprisingly been found that the bracket 34 made of plastic and molded at low cost in one step with the cover 22 is capable of forming a living hinge that allows the cover to open when the airbag 15 is deployed as explained in greater detail below in connection with FIG. 6.

The fastening bracket 34 protrudes from the interior side of the cover 22 that is invisible after installation. In the shown embodiment, the fastening bracket 34 has an L-shaped profile and protrudes at a 90-degree angle from the cover 22. The fastening bracket 34 includes a 90-degree bend that creates a flange 36 extending substantially parallel to the cover 22 in a direction toward the center of the cover 22. The flange 36 as shown includes a step 37 leaving space for an intermediate nut 30 as illustrated in FIG. 5. The flange 36 displays two slots 38 arranged perpendicular to each other and dimensioned to receive the threaded bolts 20 of the soft pack 12. Evidently, the slots 38 can be arranged at other angles or even parallel to each other.

Due to the perpendicular arrangement of the slots 38, the threaded bolts 20 are individually inserted into the slots 38 as shown in FIG. 5. A nut 30 is applied to one of the threaded bolts 20 and to fixate the soft pack 12 in the airbag holder portion 24. The step 37 compensates the thickness of the nut 30. After completing the foregoing steps, the side airbag module 10 is ready for installment in a vehicle seat.

Figure 6:
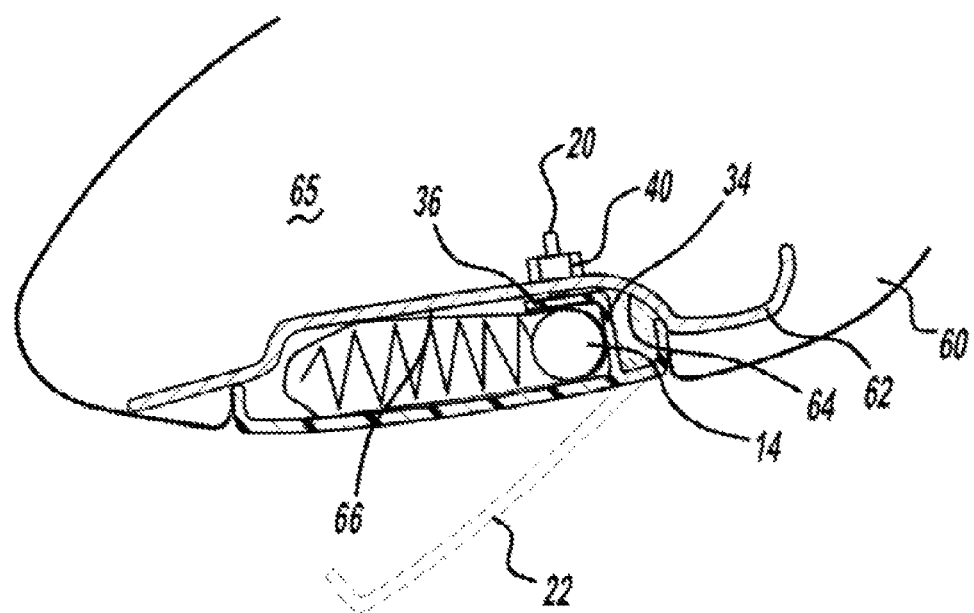
FIG. 6 shows a cross-sectional view through a back rest with an installed side airbag module along the line VI-VI of FIG. 5.

FIG. 6 shows a schematic view of a side airbag module 10 similar to the module shown in FIG. 4 installed in a back rest 60 of a vehicle seat. In a vehicle, the left side of FIG. 5 faces in the forward direction. A seat frame 62 has a cavity 64 adapted to receive the side airbag module 10 in a side bolster 65. The bolts 20 protruding from the side airbag module are inserted through matching holes (not visible) in a back wall 66 of the cavity 64 and secured with fastening nuts 40 in a plane extending substantially parallel to the cover 22.

After installation, the cover 22 covers the entire cavity 64 flush with the side bolster. The fastening bracket 34, which is formed in one piece with the cover 22, extends from the cover 22 to the back wall 66 where the flange 36 is aligned with and attached to the back wall 66.

In FIG. 6, the function of the airbag holder portion 24 is illustrated. When the gas generator 14 inflates the airbag 15, the gas pressure exerts a force on the cover 22. This outward force rotates the cover 22 outward as indicated in FIG. 6 allowing the airbag 15 to expand in a substantially forward direction with respect to the vehicle. During this rotational movement of the cover 22, the bracket 34 acts as a living hinge. It bends under the pressure of the inflating airbag 15 so that the flange 36 of the bracket 34, which is secured to the back wall 66 with the bolts 20, extends at an acute angle to the rotated cover 22. The bracket 34 is thus preferably manufactured of a type of plastic that is deformable under load and does not easily chip or break. It is desirable that the cover 22 remains attached to the seat frame 62 for reducing a risk of injury from the cover 22.

Figure 7:
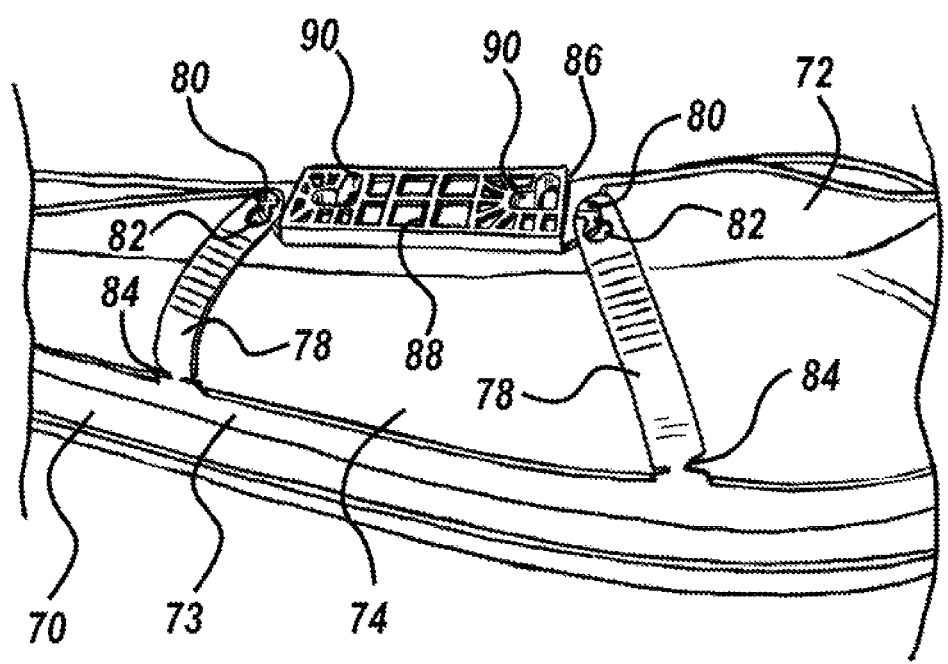
FIG. 7 shows an alternative embodiment of a cover with an attached airbag holder portion.

FIG. 7 depicts an alternative embodiment of a cover 70 made of molded plastic material. The cover 70 includes two interior skirts 72 and 73 extending along the length of the cover 70 from the side opposite to the class A surface of the cover 70. The interior skirts frame a center area 74 that is configured to accommodate a rolled-up airbag in analogy with FIG. 5.

A plastic bracket 76 is formed on an airbag holder portion 77 extending from interior skirt 72 and forms a flange extending parallel to the class A surface of the cover 70. Two flexible straps 78 extend from the interior skirt 73 opposite the airbag holder portion across center area 74. The flexible straps 78 have a length that allows them to bridge the center area 74 and to be attached to corresponding knobs 80 on the airbag holder portion 77 of interior skirt 72. Each of the knobs 80 has a stem and a thickened head. The knobs 80 may, for example, have the shape of a mushroom or of half a mushroom. The knobs 80 engage in keyhole slots 82 formed in the free ends of the flexible straps 78. At their ends attached to interior skirt 73, the flexible straps 78 have a weakened cross-section 84, shown as notches reducing the width of each of the straps 78. Alternatively or additionally, grooves or perforations may be provided that reduce the cross-section of each strap 78 to form a predetermined breaking point upon deployment of the airbag. It is also within the scope of the present invention that the flexible straps are separately formed parts that are attached to the interior skirt 73 or to the cover 70 itself in a manner that the attachment breaks when the airbag deploys, thus likewise forming a predetermined breaking point.

Notably, the straps 78 may also be utilized in the embodiment of FIGS. 3 through 6. The straps 78 may extend directly from the interior surface of the cover 22, and a fastening structure may be molded to the bracket 34, for example to flange 36.

The cover 70, the interior skirts 72 and 73, the bracket 76, and the flexible straps 78 are preferably one monolithically molded part.

The number of straps may be varied up or down without leaving the scope of the present invention. Further, the straps may be attached to the airbag holder portion 77 in a different manner, for example by snap connections. The connections are preferably releasable without destroying the straps 78 in order to replace the airbag without destroying the straps because of the monolithic structure of the cover assembly.

Further, because of the monolithic structure requiring flexibility of the plastic material for forming the straps 78 and for forming a live hinge 86, the bracket 76 may be reinforced via a stiffening honeycomb structure 88 as commonly used in injection-molded parts. In the embodiment shown, the bracket 76 includes two L-shaped slots 90 for attaching the airbag and for fastening the assembly to a seat back in analogy with FIG. 6.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A side airbag module assembly for use in a motor vehicle and adapted to be installed into a module cavity formed in an occupant seat back, the cavity receiving the module assembly in an uninflated state, the assembly comprising:

a plastic cover dimensioned to cover the cavity and forming an exposed surface, an airbag assembly having an inflator, a folded airbag, and a fastening device, and a plastic airbag holder portion unitarily molded on the cover and having a fastening structure configured to cooperate with the fastening device and configured to be fastened to the seat back wherein upon deployment of the module assembly, the folded airbag inflates, causing the cover to move to expose the airbag assembly cavity and allowing the airbag to deploy from the cavity.

2. The assembly of claim 1, further comprising that the airbag holder portion consists of a fastening bracket extending from the cover on a side opposite the exposed surface.

3. The assembly of claim 2, further comprising that the fastening bracket is configured to act as a living hinge upon deployment of the airbag.

4. The assembly of claim 2, further comprising that the bracket has an L-shaped profile with a flange extending generally parallel to the cover.

5. The assembly of claim 2, further comprising that the fastening bracket has a flange with slots.

6. The assembly of claim 5, further comprising that the slots are configured to cooperate with threaded bolts to be secured by threaded nuts.

7. The assembly of claim 6, further comprising that the fastening device is attached to the gas generator and protrudes from the airbag assembly.

8. The assembly of claim 1, further comprising a wrapper enclosing the inflator and the folded airbag to form a soft pack.

9. The assembly of claim 8, further comprising that the wrapper has at least one designated tear line of weakened strength.

10. The assembly of claim 1, further comprising that the cover is configured to be faced with upholstery fabric, leather or forms a molded decorative exposed surface.

11. The assembly of claim 1, further comprising at least one flexible strap attached to the cover opposite from the airbag holder portion across the center portion, the at least one strap extending across a center area of the cover and being releasably attached to the airbag holder portion.

12. The assembly of claim 11, further comprising a predetermined breaking point for separating the at least one flexible strap from the cover upon deployment of the airbag.

* * * * *